United States Patent
Almeida et al.

(10) Patent No.: US 9,537,717 B2
(45) Date of Patent: Jan. 3, 2017

(54) POLICY ENFORCEMENT POINT PROVISIONING

(75) Inventors: Kiran Joseph Almeida, Karnataka (IN); Viji Kakkattu Ravindran, Karnataka (IN); Niranjan Ramarajar, Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1764 days.

(21) Appl. No.: 12/729,251

(22) Filed: Mar. 23, 2010

(65) Prior Publication Data

US 2010/0269148 A1 Oct. 21, 2010

(30) Foreign Application Priority Data

Apr. 20, 2009 (IN) .............................. 906/CHE/2009

(51) Int. Cl.
*G06F 17/00* (2006.01)
*H04L 29/06* (2006.01)
*H04L 12/24* (2006.01)

(52) U.S. Cl.
CPC ........... *H04L 41/12* (2013.01); *H04L 41/0893* (2013.01); *H04L 41/5054* (2013.01); *H04L 63/20* (2013.01);
(Continued)

(58) Field of Classification Search
CPC .. H04L 41/0893; H04L 41/0896; H04L 63/10; H04L 63/20; H04L 63/205; H04L 29/06; G06F 17/00
See application file for complete search history.

(56) References Cited

U.S. PATENT DOCUMENTS 6,529,950 B1   3/2003  Lumelsky et al.
6,611,864 B2 *  8/2003  Putzolu ............... H04L 41/0893
                                                        709/223
(Continued)

FOREIGN PATENT DOCUMENTS

EP            1906347         4/2008
EP            1970809         9/2008
WO     WO2005114488    12/2005

OTHER PUBLICATIONS

Uszok et al., "KAoS policy management for semantic Web services", 2004, IEEE Publication (IEEE Intelligent Systems, vol. 19, Issue: 4, Jul.-Aug. 2004) , pp. 32-41.*

(Continued)

*Primary Examiner* — Jayesh Jhaveri
(74) *Attorney, Agent, or Firm* — Hewlett Packard Enterprise Patent Department

(57) ABSTRACT

Presented is an automated policy-provisioning method for a computing system having a service-oriented architecture. The system comprises at least one managed service and at least one policy enforcement point operable to enforce a runtime policy for the service. The method comprises: receiving in machine-readable form at least one semantic rule defining a condition imposed by a business policy; receiving machine-readable data describing a runtime policy enforcement capability of the at least one policy enforcement point; determining based on the at least one rule and the capability whether the at least one policy enforcement point can meet the condition; based on the determination, deriving a runtime policy suitable for enforcing the condition; and communicating the runtime policy to the at least one policy enforcement point.

18 Claims, 6 Drawing Sheets

(52) U.S. Cl.
CPC ............... *G06F 17/00* (2013.01); *H04L 29/06* (2013.01); *H04L 41/0896* (2013.01); *H04L 63/10* (2013.01); *H04L 63/205* (2013.01)

(56) References Cited

U.S. PATENT DOCUMENTS

| | | | | |
|---|---|---|---|---|
| 7,827,593 | B2* | 11/2010 | Smith | H04L 63/1408 |
| | | | | 709/220 |
| 7,953,877 | B2* | 5/2011 | Vemula | H04L 12/1859 |
| | | | | 370/338 |
| 8,041,825 | B2* | 10/2011 | Gibbs | H04L 41/0893 |
| | | | | 709/220 |
| 8,434,125 | B2* | 4/2013 | Ramesh et al. | 726/1 |
| 8,683,545 | B2* | 3/2014 | Nadalin | H04L 63/102 |
| | | | | 726/1 |
| 8,788,566 | B2* | 7/2014 | Liu | G06F 21/62 |
| | | | | 709/201 |
| 9,043,861 | B2* | 5/2015 | Lang | H04L 63/0263 |
| | | | | 726/1 |
| 2004/0193703 | A1 | 9/2004 | Loewy et al. | |
| 2004/0225727 | A1* | 11/2004 | Koops | H04L 41/12 |
| | | | | 709/223 |
| 2005/0038887 | A1* | 2/2005 | Cuervo et al. | 709/224 |
| 2006/0031930 | A1 | 2/2006 | Patrick et al. | |
| 2006/0041666 | A1* | 2/2006 | Karremans | 709/229 |
| 2006/0080352 | A1 | 4/2006 | Boubez et al. | |
| 2006/0212593 | A1* | 9/2006 | Patrick et al. | 709/230 |
| 2006/0282886 | A1 | 12/2006 | Gaug | |
| 2007/0150936 | A1* | 6/2007 | Maes | 726/1 |
| 2008/0065466 | A1 | 3/2008 | Liu et al. | |
| 2008/0080493 | A1* | 4/2008 | Weintraub et al. | 370/389 |
| 2008/0168420 | A1* | 7/2008 | Sabbouh | 717/104 |
| 2008/0184336 | A1* | 7/2008 | Sarukkai | G06F 21/6218 |
| | | | | 726/1 |
| 2008/0225708 | A1* | 9/2008 | Lange | 370/230 |
| 2008/0288269 | A1* | 11/2008 | Herwig | 705/1 |
| 2009/0025057 | A1* | 1/2009 | Mattsson | 726/1 |
| 2009/0125595 | A1* | 5/2009 | Maes | 709/206 |
| 2009/0172771 | A1* | 7/2009 | Soulhi | 726/1 |
| 2010/0146037 | A1* | 6/2010 | Little | G06F 17/30306 |
| | | | | 709/203 |

OTHER PUBLICATIONS

European Patent Office, Extended European Search Report, Jun. 25, 2010, 8 pages.

* cited by examiner

POLICY ENFORCEMENT POINT PROVISIONING

BACKGROUND

Service-oriented architecture (SOA) is a design paradigm for computing systems. It is based around an abstract model in which computing resources are considered in terms of needs and capabilities. In such a model, a service is an entity which is made available to a service-client, to fulfill one or more needs of the client. A core principle of SOA is that services are loosely coupled: that is, different services can be provided by different providers, potentially distributed at different physical locations or points in a computer network. Thus, services are not provided in fixed, monolithic groupings (as is often the case with legacy software applications) but, instead, a service-client can draw together the particular group of services that best fits its needs. The SOA model can be particularly beneficial when it is desired to integrate diverse computing functions—for example, several different computing functions used in a business. In this case, the SOA paradigm can lead to a reduction in redundancy, and resulting decreased commissioning and maintenance costs—for example, because common tasks such as log-in or authentication are implemented just once and then shared as a service (or set of services), instead of being provided independently in several separate software applications.

The potential improvements in efficiency and flexibility offered by SOA are great. However, the openness and interoperability demanded by such a software-architecture places additional demands on the designers of computer systems. It is desirable that an organization retains adequate control of software components made available as services, despite their open availability on a network, for example. This leads to a concept of a "managed service", which is made available for service-clients to use, but is managed according to a runtime policy. This runtime policy ensures that the overall business policy of an organization is obeyed. It is the practical implementation of the principles contained in the business policy.

Responsibility for enforcing runtime policies falls on Policy-Enforcement Points (PEP). These are points in the system architecture which can act as gateways to the services. Thus, a client wishing to access a service does so via a policy enforcement point, which enforces the runtime policy for that service. A contract is formed when one party to a service-oriented interaction agrees to adhere to the policies of another.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
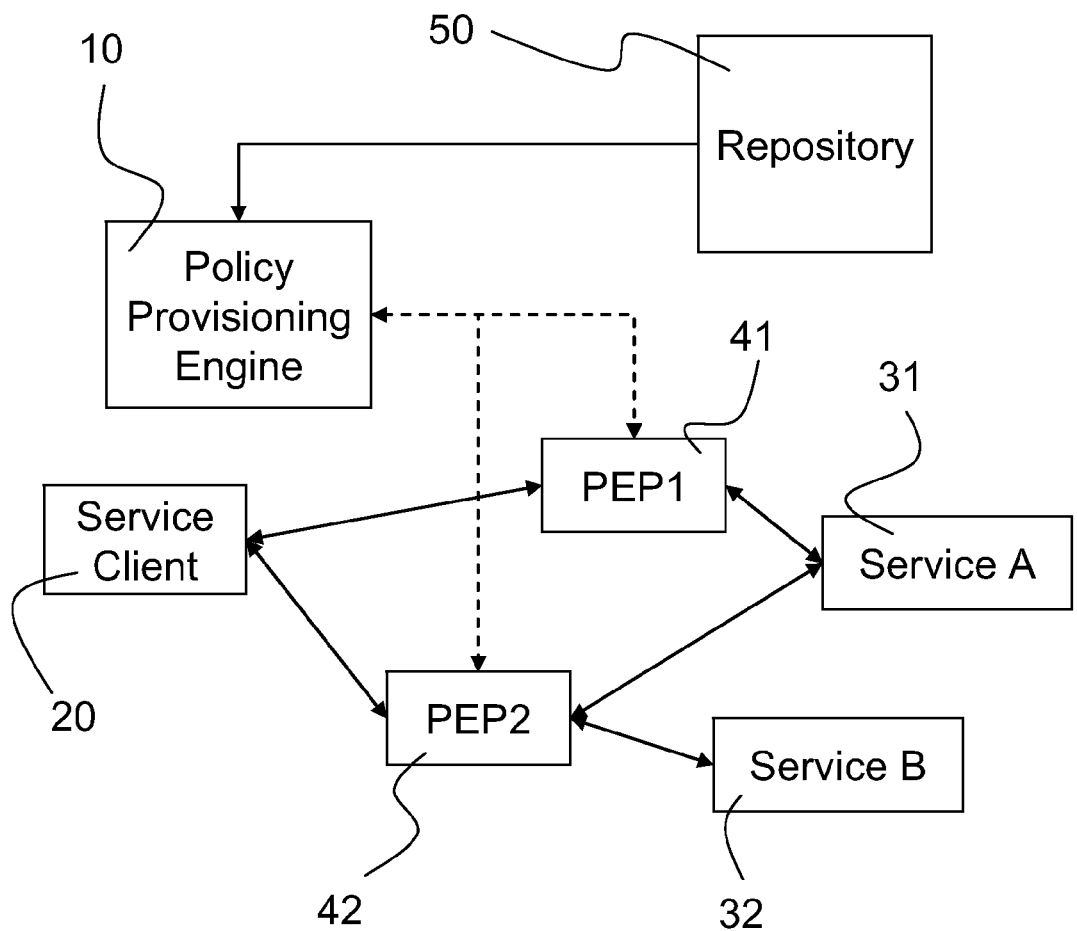
FIG. 1 is a block diagram of a policy-provisioning engine according to an embodiment in a computing system having a service-oriented architecture.

The need to design, implement and maintain runtime policies for each managed service in a SOA can make commissioning a computer system with this architecture difficult. This is particularly the case with more complicated systems, including multiple services. Each service may be accessed in many different ways by different clients, via a number of policy enforcement points; yet in each case it is intended that the runtime policy should remain consistent and faithful to the requirements of the business policy—for example, to avoid potential weaknesses in system security. As a system becomes more complex—typically changing and growing over time—it becomes increasingly difficult to ensure that the runtime policies governing the services all remain properly aligned with the business policy. Furthermore, the business policy itself may be subject to change, which should then be implemented on all the affected runtime policies.

In an enterprise deployment scenario, it is desired that services made available to customers and business partners be governed by business policies of the organization that has made the service available. Business policies represent high-level, generalized instructions. To achieve runtime governance, business policies are mapped onto appropriate runtime policies and deployed on policy enforcement points. The process of mapping business policies to runtime policies, associating appropriate runtime policies with a service and deploying the runtime polices on suitable policy enforcement points is termed "provisioning".

The provisioning process involves inspecting the capabilities of the policy enforcement points to match them with any policy requirements of the service; associating specific runtime policies with the policy enforcement points based on the business policy; and deploying the runtime policies on the appropriate policy enforcement points. According to some embodiments, some or all of the steps in the provisioning process could be efficiently automated. However, provisioning a service is not straightforward in nature and there is no single, simple, predefined automated method that could be directly applied to achieve it. There are typically multiple constraints and challenges involved in every step in the provisioning process, so it is desirable that an automated (or semi-automated) approach should be flexible and able to dynamically adapt to these constraints, which may themselves be changing.

The different participants in the provisioning process all pose challenges. Each service can have its own individual attributes that need to be taken into consideration while deriving the runtime policy. For example, if the service uses Java Message Service (JMS) as the inbound mechanism to accept messages, the provisioning engine cannot blindly apply a transport security policy to secure the service; in such a situation, message level security policy needs be applied to protect the incoming messages.

Similarly, although any given Policy Enforcement Point can have a variety of capabilities to achieve the desired implementation of the business policy, some approaches might be preferable to others. For example, a PEP might be capable of protecting the service both at message level and transport level, however message level security might present a more favorable strategy than transport level security.

Likewise, the complexity and diversity of organizations' business policies present a challenge. There could be a large number of ways of enforcing a business policy—for example, a business policy might be enforceable by a combination of Policy-A and Policy-B, or it could be realized by enforcing a single Policy-C, and so on. As a result, there is no direct, generic, universally applicable mapping between the business policy and the technical policies that can simply be blindly automated.

FIG. 1 shows a block diagram of computer system having a service-oriented architecture. The computer system comprises a policy provisioning engine 10 according to an embodiment. The computer system includes a number of services, for example, Service A 31 and Service B 32. These services are made available to a service client 20 via two policy enforcement points (PEPs), PEP1 41 and PEP2 42. The policy provisioning engine 10 is provided to configure the PEPs with a suitable runtime policy. This configuration step is an offline process—that is, the policy provisioning engine can be run once, and thereafter it does not need to communicate with the PEPs. This one-time communication is indicated by the dashed line in FIG. 1. Of course, the policy provisioning engine may rerun the configuration process to provide a new runtime policy—for example, when new services or policy enforcement points are added to the system; or if the business policy changes.

A repository 50 is optionally provided. The repository can store information about the services 31, 32 and/or the PEPs 41, 42. In this case, the repository 50 is a central location that serves as a medium of persistence for service and policy enforcement point artifacts. The policy provisioning engine 10 can consult the repository 50 to discover the capabilities of the PEPs 41, 42 and the details of each service 31, 32. Note that the repository 50 may also have a role in the normal operation of the computer system, by also enabling discovery by the service client 20 of the available services 31, 32.

Each PEP 41, 42 is able to provide runtime governance for one or more of the services 31, 32. In the example configuration illustrated by FIG. 1, PEP1 41 manages Service A 31; PEP2 42 manages both Service A 31 and Service B 32. The service client 20 may access Service A 31 via either of the PEPs 41, 42 and can access Service B 32 only through PEP2 42. Each PEP enforces various run time policies for the services it manages. These runtime policies may include a security policy or an audit policy, for example.

The policy provisioning engine 10 derives appropriate runtime policies for each PEP to enforce. These policies are based on the overall business policy of the organization. The provisioning engine 10 deploys these individual runtime policies on the respective PEPs. By centrally coordinating the provision of the runtime policies, the system can preferably ensure consistent runtime governance in accordance with the business policy.

Figure 2:
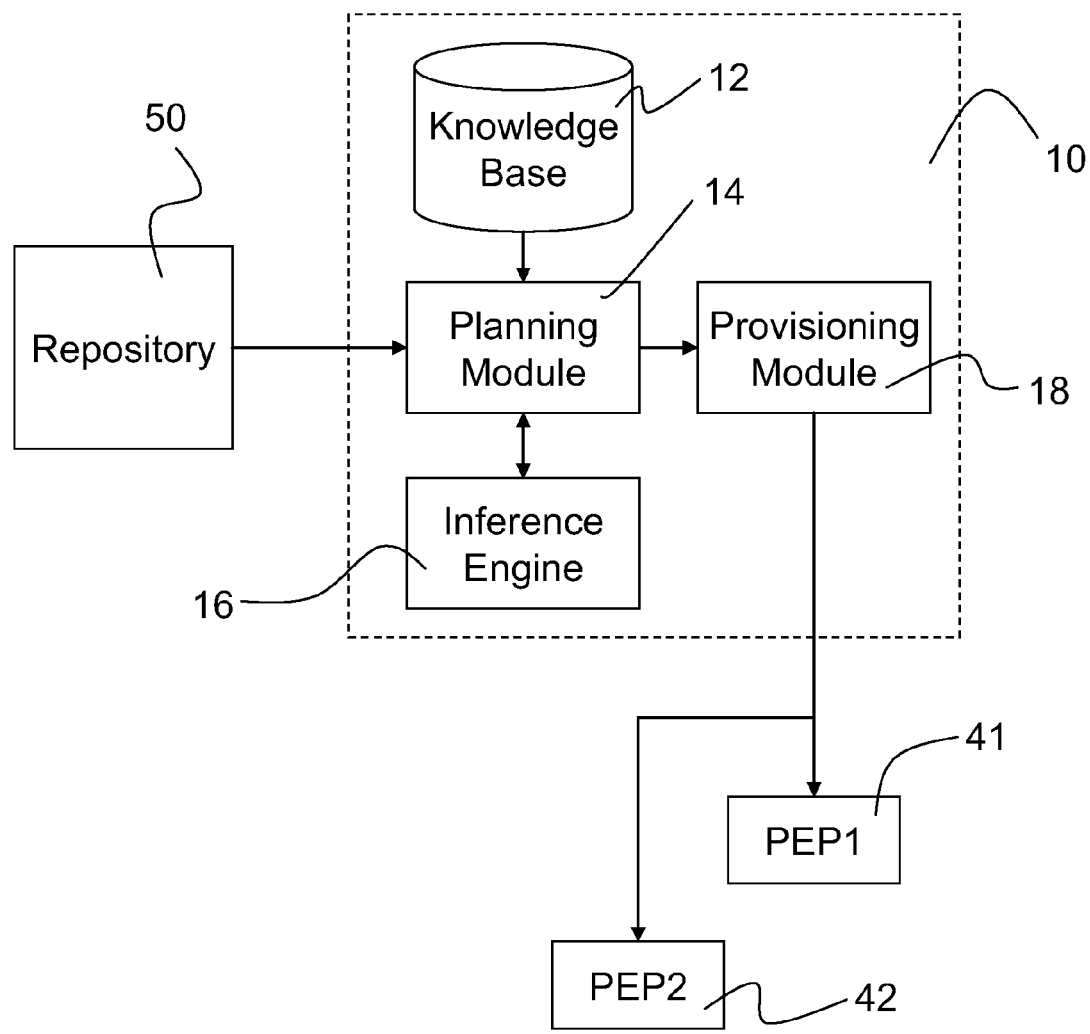
FIG. 2 is a block diagram showing the components of a policy-provisioning engine according to an embodiment.

FIG. 2 shows the logical structure of the provisioning engine 10 in greater detail. The provisioning engine includes a knowledge base 12; planning module 14; inference engine 16; and provisioning module 18. The knowledge base stores data describing the business policy of the organization. This information typically includes a set of rules, which are the conditions set by the business policy; and some model of the concepts used to express the rules. The model of the concepts in the business policy may be, for example, an ontology. The knowledge about the business policy is used by the planning module 14 in deriving appropriate, and preferably optimal, runtime policies.

The planning module 14 is responsible for planning runtime policies, based on the constraints of the business policy obtained from the knowledge base 12 and information about the capabilities of each PEP and needs of each service, obtained from the repository 50. For example, the planning module 14 may select a given service registered in the repository 50; identify requirements imposed on the use of that service, based on the business policy contained in the knowledge base; and then develop suitable runtime policies for one or more PEPs to manage access to the service.

The development of the runtime policies in this way may comprise logical reasoning using all the available information and constraints. The planning module 14 uses the inference engine 16 to carry out such reasoning.

When the planning module 14 has developed appropriate runtime policies, the provisioning module 18 is used to communicate these to their respective associated PEPs 41, 42. Each policy enforcement point exposes operations to support the provisioning of the policies, for example as semantic web services. The PEP may also support functions for automated discovery of PEP capabilities. That is, the provisioning engine 10 may interrogate each PEP directly, to determine its capabilities. This may be alternative to or in addition to the storage of PEP descriptions in the repository 50.

Note that some components, shown in FIG. 2 as included in the provisioning engine 10, may alternatively be provided externally or in different groupings. For example, the knowledge base 12 may be external to the provisioning engine 10 (like the repository 50, shown in FIGS. 1 and 2).

Figure 3:
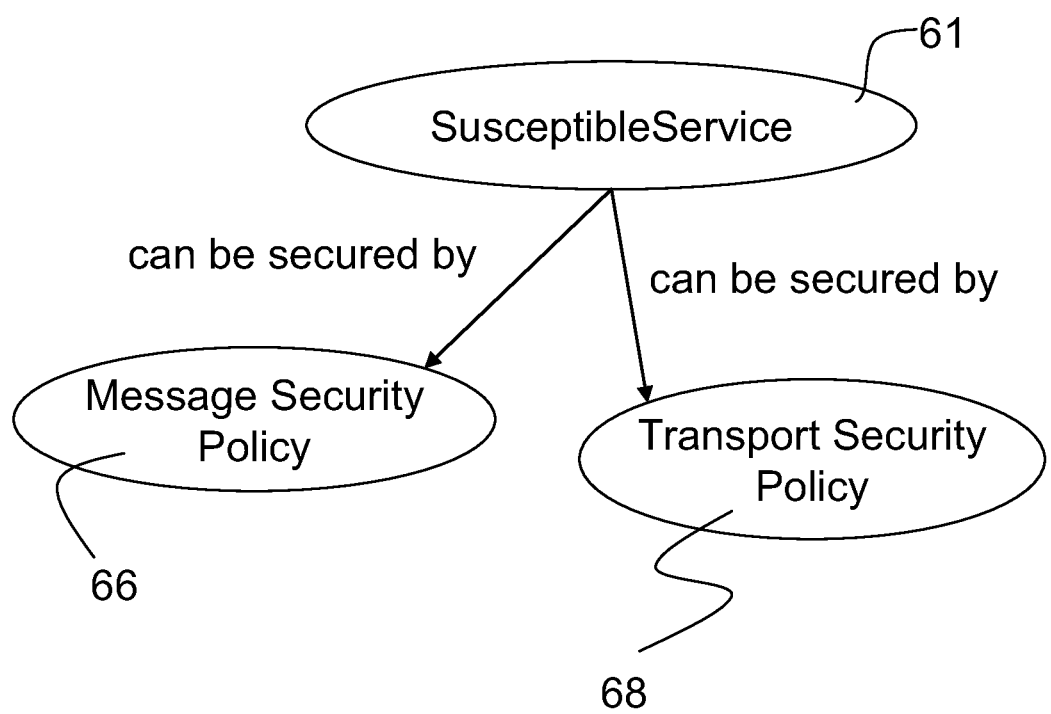
FIG. 3 is a diagram illustrating an example of an ontology modeling the concept of a "SusceptibleService"

As described above, the information about the concepts used to describe the business policy may be stored in the knowledge base 12 in the form of an ontology. As will be well known to the skilled person, an ontology is a structured representation of a set of concepts and relationships between them. An ontology can be used to support logical reasoning. FIG. 3 shows an example of an ontology modelling the concept of a "SusceptibleService" 61. This ontology represents the knowledge that there is a particular category of service (called "SusceptibleService") which, according to the business policy, can be secured by either a "message security policy" 66 or by a "transport security policy" 68.

Figure 4:
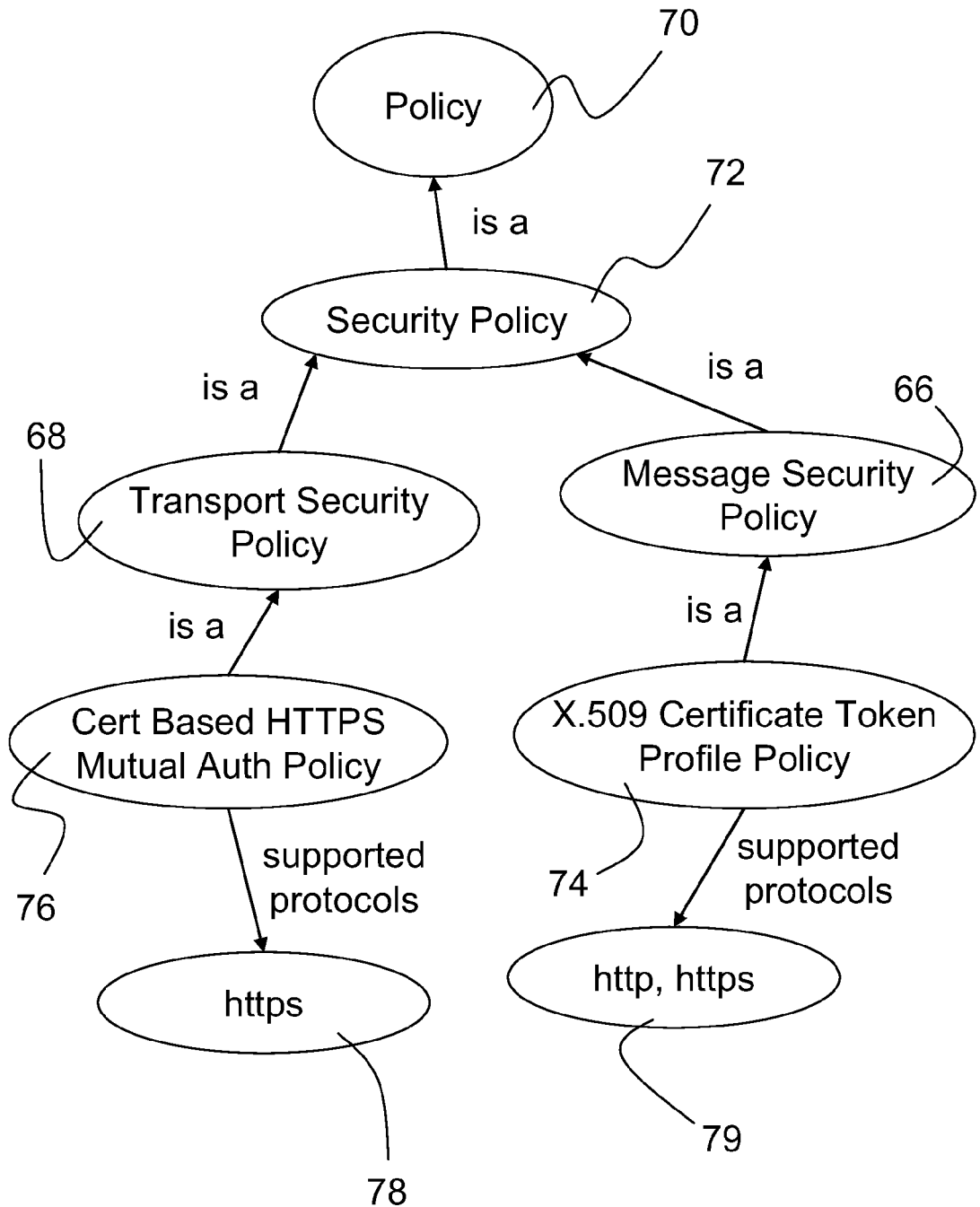
FIG. 4 is a diagram illustrating an example of an ontology which models a hierarchy of policies.

FIG. 4 shows an example of a hierarchy of different types of policy. The ontology captures the following relationships. A "security policy" 72 is a "policy" 70. A "transport security policy" 68 and a "message security policy" 66 are both examples of a "security policy" 72. A "certificate-based HTTPS mutual authentication policy" 76 is a kind of "transport security policy" 68. This kind of policy is supported by the HTTPS protocol 78. An "X.509 certificate token profile policy" 74 is a type of "message security policy" 66. This kind of policy is supported by both the HTTP and HTTPS protocols 79.

From the ontologies shown in FIGS. 3 and 4, the inference engine 16 can deduce that a service of type SusceptibleService 61 can be secured by a "transport security policy" 68 over HTTPS; or it may be secured by a "message security policy" 66, over either HTTP or HTTPS. This very simple example shows, in principle, how logical reasoning may be used on a wider scale to infer possible runtime policies, using domain-specific knowledge stored in an ontology. It also shows how the concepts of a business policy, which are usually documented in natural language, can be represented in a format which is machine readable and processable. For example, an ontology could be represented in eXtensible Markup Language (XML), or other suitable language or format.

According to embodiments, the rules of the business policy are also represented in machine-readable form. Furthermore, the capabilities of each PEP and descriptions of each service may be provided in machine-readable form—for example in the repository 50, or by direct interrogation of the PEPs and services by the provisioning engine 10.

Embodiments such as those shown in FIGS. 1 and 2 may be used to provision suitable runtime policies in a number of phases. The first phase is a business policy modeling phase. In this phase, the knowledge contained in the business policy or policies is captured and modeled using ontologies, as described above. Semantic rules are generated that can be used by intelligent software components, together with the ontologies, to automatically generate the runtime policies which will govern the services. The business policy modeling phase may comprise manual entry of this business policy information. For example, during the business policy modeling phase, semantic rules and ontologies capture domain knowledge and associated constraints, preferably in a machine processable format. Since ontologies support logical reasoning, the knowledge contained within the ontologies can later be exploited to devise the provisioning strategy.

The next phase is a capability discovery phase. In this phase, the capabilities of the policy enforcement points registered in the repository are examined. The operations supported by the PEPs to provision a service with appropriate policies are also examined. This information can be used by the provisioning engine 10 to determine how each policy enforcement point may participate in the management of services according to the business policy. Optionally, the capability data relating to each PEP may be incorporated in one or more ontologies maintained by the knowledge base 12. This may comprise creating new ontologies or updating those already present in the knowledge base.

In the planning phase, the provisioning engine 10 selects a given service to be provisioned. The description of the service stored in the repository 50 is examined, to assess which constraints imposed by the business policy apply to this service. Using the inference engine 16 to perform logical reasoning, the planning module 14 combines the rules and ontologies defining the business policy with the information about the capabilities of each policy enforcement point, to arrive at one or more effective runtime policies for the service. These plans represent the possible ways in which the requirements of the business policy can be met by the available PEPs, for that service. If more than one set of possibilities is feasible, the system designer can select among them. Alternatively, the knowledge base 12 may include knowledge of preferences for some possibilities over others. This can preferably enable the planning module 14 to design an optimal runtime policy, based on all the available constraints and preferences. If the planning module 14 determines that it is impossible to meet the business policy requirements in a given case, the provisioning engine 10 can alert the system designer to this problem.

In the execution phase, the approved plan is communicated to the relevant PEPs. This can be by means of a sequence of web service calls on each PEP. This phase applies the planned runtime policy to the PEPs, which are then ready to manage the service properly in normal use of the computer system. The planning and/or execution phases can be repeated for each service in the system. Some or all of the phases may be repeated when services, PEPs, or business policies change.

Figure 5:
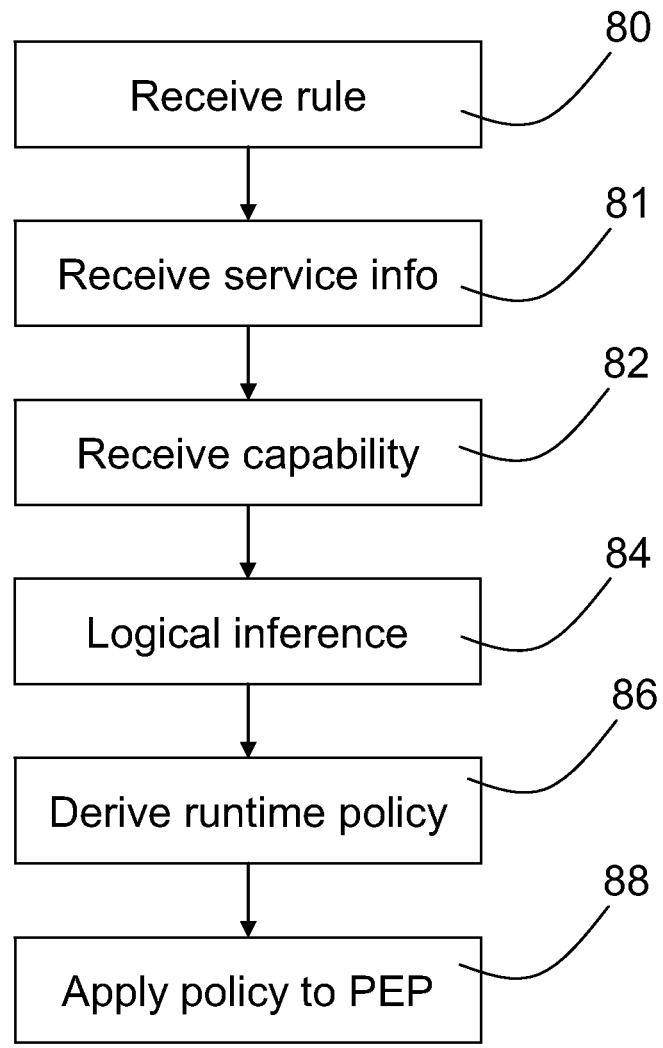
FIG. 5 is a flowchart for an automated policy-provisioning method according to an embodiment.

FIG. 5 shows a flow chart of a method according to an embodiment. In step 80, the rules captured in the business policy modeling phase are received by the planning module 14 from the knowledge base 12.

In step 81, details of the service or services 31, 32 being provisioned are received from the repository 50. This service information may include explicit details of the requirements of each service, or may include information identifying the type of service, such that its requirements can be inferred—for example, from knowledge already captured in the knowledge base 12. As an alternative to receiving service information from the repository 50, services 31, 32 may provide this information to the provisioning engine themselves, directly or indirectly. In either case, the information enables the provisioning engine to determine which rule or rules are relevant to any given service. That is, based on the information, the provisioning engine is able to determine which aspects of the business policy are applicable to a given service.

Note also that step 81 may be optional in some circumstances: the runtime policy will not necessarily always depend on the service requirements—for example, in the trivial case that all services in the system have the same known, standard requirements.

Capability information for each PEP is then received in step 82. The capability information may be received either from the PEPs themselves or also from the repository 50. In step 84, the planning module 14 controls the inference engine 16 to perform logical inference. This deduces possible ways of satisfying the business policy for a given service or services of interest, enabling the planning module 14 to derive a complete runtime policy in step 86. The runtime policy is communicated and applied to one or more suitable PEPs in step 88.

Figure 6:
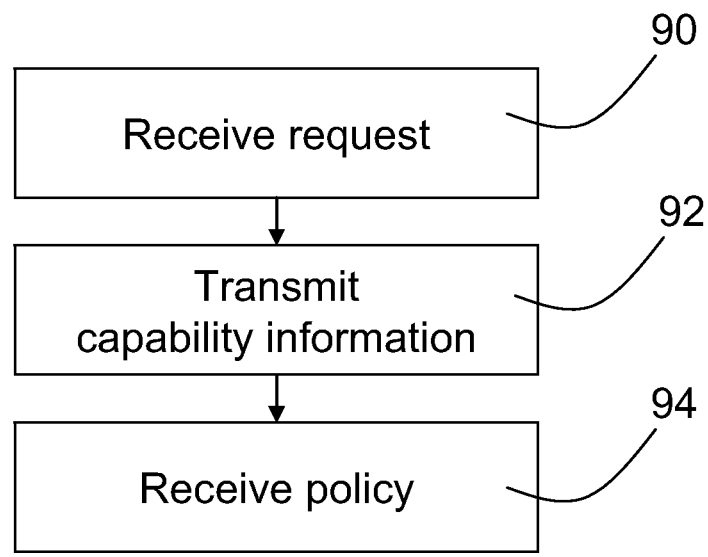
FIG. 6 is a flowchart for a policy-enforcement point configuration method, according to an embodiment.

FIG. 6 shows a flow chart of a method according to an embodiment which is executed by a PEP. In step 90, the PEP 41, 42 receives a request from the provisioning engine 10 for information relating to its policy enforcement capabilities. In response, in step 92 the PEP 41, 42 provides machine-readable information about its capabilities to the provisioning engine 10. After the provisioning engine 10 has planned a suitable policy for this PEP (and potentially other PEPs in the system) the provisioning engine 10 communicates the policy to the PEP, where it is received in step 94. The policy is thereafter applied by the PEP to control the interactions of each service client 20 with the services managed by the PEP.

These general processes will now be illustrated by way of a simple concrete example. In this example, a company wishes to make a stock quote service 31 available to its customers and business partners as a web service. All requests to the service pass through policy enforcement points, which provide governance to the manage service by enforcing various policies at runtime. There are two policy enforcement points 41 and 42. PEP1 41 is of a first type, while PEP2 42 is of a second type.

Let us assume, for example, that the business policy states that "all communications with an externally accessible service must occur in a secure environment". In order to design a provisioning strategy that meets the above stated business requirement, the provisioning engine captures necessary knowledge using semantic rules and ontologies. This process enables the provisioning engine to interpret the predefined knowledge and devise an appropriate provisioning strategy.

According to the current illustrative example, a simple ontology is defined with class Service. An operator isExternallyAccessible is defined that checks whether the service is externally accessible or not. Let SusceptibleService be a subclass of Service. During the business policy modeling phase, the system designer writes a semantic rule which captures this business policy. This can be done using Semantic Web Rule Language (SWRL). This language is defined by "SWRL: A Semantic Web Rule Language, W3C Member Submission 21 May 2004", available at: http://www.w3.org/Submission/SWRL. Using this language, the particular business policy requirement can be defined using a simple rule, as follows:

Service (?someService)^ isExternallyAccessible (?someService)=>SusceptibleService (?someService)

This rule states that any Service represented by the variable ?someService, if externally accessible, implies that it is a SusceptibleService. Now, if the SusceptibleService concept is modeled using an ontology like that shown in FIG. 3, then by using simple queries the provisioning engine can conclude that a SusceptibleService can be secured either by enforcing Message Security Policy or by enforcing Transport Security Policy. So, any service satisfying the rule should be secured using one or other of these two types of policy. This illustrates how, using semantic rules and ontologies, the provisioning can formulate suitable decisions needed to develop a suitable provisioning strategy.

During the policy enforcement point capability discovery phase, the provisioning engine discovers the capabilities of the registered policy enforcement points 41 and 42 and builds a semantic model of the capabilities and their attributes. The provisioning engine discovers the following aspects:

Policies that can be enforced by a given PEP:
    PEP1 41 can enforce Certificate Based HTTPS Mutual Authentication Policy
    PEP2 42 can enforce Certificate Based HTTPS Mutual Authentication Policy and X.509 Certificate Token Profile Policy
    Types of the policies supported:
    Certificate Based HTTPS Mutual Authentication Policy is a Transport Security Policy
    X.509 Certificate Token Profile Policy is a Message Security Policy
    Attributes of each of the supported policies:
    X.509 Certificate Token Profile Policy supports HTTP, HTTPS
    Certificate Based HTTPS Mutual Authentication Policy supports HTTPS only In the current illustrative example, using the information discovered in the capability discovery phase, the provisioning engine is able to build a semantic model of the policy hierarchy, like the one shown in FIG. 4.

The provisioning engine now has all the information needed to automatically generate the provisioning strategy:

Semantic Rules and Knowledge from the Business policies modeling phase (input at the time the business policy is being designed)
    Knowledge about the capabilities of the PEP from the Policy enforcement point capability discovery phase (automatically and/or interactively discovered at the time the provisioning engine is run)

Using the knowledge gained in the Business policies modeling phase, the provisioning engine knows that if the service is exposed to the outside world; it is a susceptible service; it also knows that the susceptible service can be secured by enforcing either message security policy or transport security policy. From the Policy enforcement point capability discovery phase, the provisioning engine is also aware that PEP 41 of Type-1 supports enforcement of Cert Based HTTPS Mutual Auth Policy while PEP 42 of Type-2 supports enforcement of Cert Based HTTPS Mutual Auth Policy and X.509 Certificate Token Profile Policy and that Cert Based HTTPS Mutual Auth Policy is a transport security policy and that X.509 Certificate Token Profile Policy is a message security policy.

Finally, the provisioning engine is able to evolve 2 plans that satisfy the requirements:

Plan-A
        The Service 31 can be deployed on PEP1 41 of Type-1; transport level security is provided by Cert Based HTTPS Mutual Auth Policy and the service is accessible over HTTPS
        The Service 31 can be deployed on PEP2 42 of Type-2; transport level security is provided by Cert Based HTTPS Mutual Auth Policy and the service is accessible over HTTPS
    Plan-B:
        The Service 31 can be deployed on PEP1 41 of Type-1; transport level security is provided by Cert Based HTTPS Mutual Auth Policy and the service is accessible over HTTPS
        The Service 31 can be deployed on PEP2 42 of Type-2; message level security is provided by X.509 Certificate Token Profile Policy and the service is accessible over HTTP.

In both the scenarios, the objective of secure communication is achieved either through message level or by transport level security.

If the knowledge base is knowledgeable about preferences for some possibilities over others, the system can recommend an optimal plan among the proposed plans. For instance, given a choice between message level security and transport level security, an organization might prefer message level security to transport level security, since message level security permits encrypting only part of the message that contains sensitive information instead of whole message being encrypted. This can significantly reduce the processing time for encryption. If this knowledge is contained in the provisioning engine then it can rank Plan-B higher than Plan-A. Plan-B can then be suggested to the system designer as an optimal choice of plan among the options. This can remove a further burden from the system designer.

Data and instructions of the policy provisioning engine 10; its components the planning module 14, inference engine 16, and provisioning module 18; and any other software components of the system can be stored in respective storage devices, which are implemented as one or more computer-readable or computer usable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

The policy provisioning engine may thus be implemented or embodied by one or more physical computing devices. For example, the knowledge base 12 and or the repository 50 may be provided as data stored on storage media. Such storage media may include different forms of memory as already noted in the preceding paragraph. Thus, for example, memories may be provided to store the semantic rules of the business policy; the data describing the runtime policy enforcement capability of the PEPs; and the information about the requirements of services.

A processor in the computing device may be controlled to execute instructions performing the functions of the provisioning engine, including the functions of any or all of the planning module; the inference engine and the provisioning module.

As is well known, physical computing devices may have input and output means of various types. The input means may be used to receive the data to be stored in the memory or memories, and used by the provisioning engine—for example, the rules and models comprising the business policy; the PEP capabilities; or service details. The output means may be used to communicate the derived runtime policy from the provisioning engine to the PEPs. The input and output means can comprise any of a wide variety of conventional input/output devices suitable for computers. As will be apparent to the skilled person, these include (but are not limited to) wired or wireless network connections; other optical or electrical communications interfaces such as Universal Serial Bus (USB); and removable (or static) storage media. In the business policy modeling phase, the business policy information (for example, the semantic rules and/or ontologies) may be input manually by the system designer by input means such as a keyboard or mouse, or any other human-machine interface.

While specific embodiments have been described herein for purposes of illustration, various other modifications will be apparent to a person skilled in the art and may be made without departing from the scope of the invention.

The invention claimed is:

1. An automated policy-provisioning method for a computing system having a service-oriented architecture, the system comprising at least one managed service and at least one policy enforcement point operable to enforce a runtime policy for the service, the method comprising:
   using a physical computing device, receiving in machine-readable form at least one semantic rule defining a condition imposed by a business policy;
   using a physical computing device, receiving machine-readable data describing a runtime policy enforcement capability of the at least one policy enforcement point;
   using a physical computing device, determining based on the at least one rule and the capability whether the at least one policy enforcement point can meet the condition;
   using a physical computing device and based on the determination, deriving a runtime policy suitable for enforcing the condition; and
   using a physical computing device, communicating the runtime policy to the at least one policy enforcement point.

2. The method of claim 1, further comprising:
   receiving in machine-readable form data describing a model of a plurality of concepts used to define the business policy,
   wherein the model specifies a first set of semantic relationships among the concepts and
   the at least one rule specifies a second set of relationships among the concepts, the first and second set of relationships comprising the business policy.

3. The method of claim 2, wherein the model comprises an ontology.

4. The method of claim 2, wherein the model and the at least one semantic rule are received from a knowledge base, to which they have previously been input.

5. The method of claim 1, wherein the machine readable data describing the runtime policy enforcement capability of the at least one policy enforcement point is received either:
   directly from the at least one policy enforcement point itself; or
   from a repository to which the data has previously been stored.

6. The method of claim 1, further comprising:
   using a physical computing device, receiving in machine readable form information describing the at least one managed service; and
   using a physical computing device, determining based on the information that the at least one semantic rule is applicable to the managed service.

7. The method of claim 1, comprising, in the step of determining whether the at least one policy enforcement point can meet the condition,
   determining that the at least one policy enforcement point can meet the condition in two or more different ways; and
   selecting among the two or more different ways.

8. The method of claim 7, wherein the step of deriving the runtime policy comprises selecting among the two or more different ways based on a predetermined preference.

9. The method of claim 1, comprising, in the step of determining whether the at least one policy enforcement point can meet the condition,
   determining that the at least one policy enforcement point cannot meet the condition; and
   alerting a user to this fact.

10. The method of claim 1, wherein the step of communicating the runtime policy comprises executing a series of web service calls on the at least one policy enforcement point.

11. A policy-enforcement-point configuration method for a computing system having a service-oriented architecture, the system comprising at least one managed service, the policy enforcement point being operable to enforce a runtime policy for the service, the method comprising:
   receiving a request from a provisioning engine for information at a physical computing device implementing the policy-enforcement point;
   in response to the request, transmitting to the provisioning engine, using the physical computing device, machine-readable data describing a runtime policy enforcement capability of the policy enforcement point;
   with the provisioning engine, deriving a runtime policy suitable for enforcing a condition imposed by a business policy, in which suitability is based on at least one rule and the runtime policy enforcement capability; and
   receiving from the provisioning engine, at the physical computing device, the runtime policy to be enforced.

12. A computer program product for provisioning policies, the computer program product comprising:
   a non-transitory computer readable storage medium comprising computer usable program code embodied therewith, the computer usable program code comprising:

computer usable program code to, when executed by a processor, receive, in machine-readable form, at least one semantic rule defining a condition imposed by a business policy;

computer usable program code to, when executed by a processor, receive machine-readable data describing a runtime policy enforcement capability of the at least one policy enforcement point;

computer usable program code to, when executed by a processor, determine, based on the at least one rule and the capability, whether the at least one policy enforcement point can meet the condition;

computer usable program code to, when executed by a processor, derive a runtime policy suitable for enforcing the condition based on the determination; and computer usable program code to, when executed by a processor, communicate the runtime policy to the at least one policy enforcement point.

13. A computer program as claimed in claim 12, in which the computer readable storage medium is a non-transitory computer-readable medium.

14. A provisioning engine, for automated policy-provisioning for a computing system having a service-oriented architecture, the system comprising at least one managed service and at least one policy enforcement point operable to implement runtime governance of the managed service by enforcing a runtime policy, the provisioning engine comprising:

a memory, for storing in machine-readable form:
at least one semantic rule defining a condition imposed by a business policy; and
data describing a runtime policy enforcement capability of the at least one policy enforcement point, a processor, adapted to:
determine based on the at least one rule and the capability whether the at least one policy enforcement point can meet the condition, and
based on the determination, to derive a runtime policy suitable for enforcing the condition, and output means, for communicating the runtime policy to the at least one policy enforcement point.

15. The provisioning engine of claim 14, further comprising:
input means, for receiving in machine-readable form the at least one semantic rule; and
input means, for receiving in machine-readable form the data describing the runtime policy enforcement capability of the at least one policy enforcement point.

16. The method of claim 11, further comprising:
determining whether the policy enforcement point can meet the condition,
determining that the policy enforcement point can meet the condition in two or more different ways; and
selecting among the two or more different ways.

17. The method of claim 16, in which deriving the runtime policy comprises selecting among the two or more different ways based on a predetermined preference.

18. The method of claim 16, further comprising:
determining that the at least one policy enforcement point cannot meet the condition; and
alerting a user to this fact.

* * * * *